(12) United States Patent
Rajkhowa et al.

(10) Patent No.: US 12,299,632 B2
(45) Date of Patent: May 13, 2025

(54) SYSTEMS AND METHODS FOR DUAL OPTIMIZATION OF PICK WALK AND TOTE FILL RATES FOR ORDER PICKING

(71) Applicant: Walmart Apollo, LLC, Bentonville, AR (US)

(72) Inventors: Pratosh D. Rajkhowa, Sunnyvale, CA (US); Ameya Ajay Shendre, Bangalore (IN); Shekhar Gupta, Bengaluru (IN); Pavan Kumar, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/378,030

(22) Filed: Oct. 9, 2023

(65) Prior Publication Data

US 2024/0104496 A1   Mar. 28, 2024

Related U.S. Application Data

(63) Continuation of application No. 17/383,977, filed on Jul. 23, 2021, now Pat. No. 11,823,123, which is a
(Continued)

(30) Foreign Application Priority Data

Apr. 20, 2018  (IN) .............................. 201811015004

(51) Int. Cl.
*G06Q 10/087*   (2023.01)
*G06Q 10/04*   (2023.01)

(52) U.S. Cl.
CPC .......... *G06Q 10/087* (2013.01); *G06Q 10/04* (2013.01)

(58) Field of Classification Search
CPC ....... G06Q 10/087; G06Q 10/04; G06Q 10/08
See application file for complete search history.

(56) References Cited

U.S. PATENT DOCUMENTS 5,111,391 A * 5/1992 Fields ............ G06Q 10/063112
705/7.14
5,524,077 A * 6/1996 Faaland ........... G06Q 10/06312
705/7.22
(Continued)

FOREIGN PATENT DOCUMENTS

| DE | 102012100354 A1 | 7/2013 |
| WO | 2013116620 A1 | 8/2013 |
| WO | 2019204281 | 10/2019 |

OTHER PUBLICATIONS

G. Pedrielli, A. Vinsensius, E. P. Chew, L. H. Lee, A. Duri and Haobin Li, "Hybrid order picking strategies for fashion E-commerce warehouse systems," 2016 Winter Simulation Conference (WSC), Washington, DC, USA, 2016, pp. 2250-2261, (Year: 2016).*
(Continued)

*Primary Examiner* — Ashford S Hayles
(74) *Attorney, Agent, or Firm* — Fitch, Even, Tabin & Flannery, LLP

(57) ABSTRACT

Methods and systems and computer-readable media are provided for dual optimization of pick walk and tote fill rates in order picking. Embodiments provide improved order picking speed and quality by optimizing pick routing with consideration of both proximity constraints and tote value constraints. Tote value constraints can include constraints on carrying capacity, volume, size in a particular dimension, or weight capacity.

12 Claims, 5 Drawing Sheets

Related U.S. Application Data continuation of application No. 16/040,910, filed on Jul. 20, 2018, now Pat. No. 11,074,547.

(56) References Cited

U.S. PATENT DOCUMENTS

| | | | |
|---|---|---|---|
| 5,890,134 A * | 3/1999 | Fox | G06Q 10/06313 705/7.22 |
| 5,911,134 A * | 6/1999 | Castonguay | G06Q 10/06 379/112.09 |
| 6,289,260 B1 * | 9/2001 | Bradley | B65G 1/1376 414/280 |
| 6,721,762 B1 | 4/2004 | Levine | |
| 6,744,436 B1 * | 6/2004 | Chirieleison, Jr. | G06Q 10/087 345/419 |
| 6,871,184 B1 | 3/2005 | Liberman | |
| 6,904,421 B2 | 6/2005 | Shetty | |
| 7,031,801 B1 | 4/2006 | Hodge | |
| 7,139,637 B1 | 11/2006 | Waddington | |
| 7,295,990 B1 * | 11/2007 | Braumoeller | G06Q 10/063 705/28 |
| 7,346,531 B2 * | 3/2008 | Jacobs | G06Q 10/109 705/7.14 |
| 7,356,376 B1 * | 4/2008 | Aboujaoude | G06Q 10/06 700/100 |
| 7,478,050 B1 * | 1/2009 | Togawa | G06Q 10/06311 705/7.26 |
| 7,686,171 B1 | 3/2010 | Shakes | |
| 7,721,212 B2 * | 5/2010 | Alfandary | G06Q 10/087 715/965 |
| 7,809,676 B2 * | 10/2010 | Chorley | G06Q 10/06 707/600 |
| 7,865,398 B2 | 1/2011 | Schoen | |
| 7,894,933 B2 | 2/2011 | Mountz | |
| 7,930,050 B2 * | 4/2011 | Wertheimer | G06Q 10/087 705/28 |
| 8,055,377 B2 * | 11/2011 | Yair | G06Q 10/087 700/214 |
| 8,086,344 B1 * | 12/2011 | Mishra | G06Q 10/087 700/214 |
| 8,201,737 B1 * | 6/2012 | Palacios Durazo | G06Q 10/087 235/383 |
| 8,234,006 B1 | 7/2012 | Sachar | |
| 8,244,603 B1 | 8/2012 | Tang | |
| 8,504,413 B1 | 8/2013 | Rowe | |
| 8,527,325 B1 * | 9/2013 | Atreya | G06Q 10/06 700/214 |
| 8,560,461 B1 | 10/2013 | Tian | |
| 8,571,702 B1 * | 10/2013 | Haake | G06Q 10/047 705/26.1 |
| 8,571,915 B1 * | 10/2013 | Wong | G06Q 10/06 705/7.26 |
| 8,682,473 B1 | 3/2014 | Ramey | |
| 8,798,784 B1 | 8/2014 | Clark | |
| 8,839,132 B2 * | 9/2014 | Reichert | G06Q 10/087 715/764 |
| 8,918,750 B1 * | 12/2014 | Moffitt | G06F 30/18 716/122 |
| 8,983,647 B1 * | 3/2015 | Dwarakanath | G05D 1/0297 700/216 |
| 9,147,208 B1 | 9/2015 | Argue | |
| 9,172,738 B1 * | 10/2015 | daCosta | G06Q 30/0601 |
| 9,174,800 B1 | 11/2015 | Curlander | |
| 9,202,197 B1 | 12/2015 | Ramey | |
| 9,242,799 B1 | 1/2016 | O'Brien | |
| 9,428,295 B2 | 8/2016 | Vliet | |
| 9,466,045 B1 * | 10/2016 | Kumar | G06Q 10/087 |
| 9,519,882 B2 | 12/2016 | Galluzzo | |
| 9,551,987 B1 | 1/2017 | Mountz | |
| 9,613,335 B2 | 4/2017 | Grissom | |
| 9,626,709 B2 | 4/2017 | Koch | |
| 9,656,805 B1 | 5/2017 | Evans | |
| 9,778,957 B2 * | 10/2017 | Colson | G06Q 10/06311 |
| 9,828,128 B1 * | 11/2017 | Linnell | B65B 57/00 |
| 9,864,962 B1 * | 1/2018 | Lehmann | G06Q 10/06311 |
| 10,007,947 B2 * | 6/2018 | Seaward | G06Q 30/0631 |
| 10,026,044 B1 * | 7/2018 | Wurman | G06Q 10/08 |
| 10,032,136 B1 * | 7/2018 | Hamilton | G06Q 10/0633 |
| 10,043,149 B1 * | 8/2018 | Iacono | G06Q 30/0637 |
| 10,127,514 B2 | 11/2018 | Napoli | |
| 10,163,070 B1 * | 12/2018 | Phillips | G06Q 10/083 |
| 10,248,929 B2 * | 4/2019 | Lindbo | G06Q 10/087 |
| 10,322,881 B1 | 6/2019 | Manyam | |
| 10,331,609 B2 | 6/2019 | Kohtz | |
| 10,482,421 B1 * | 11/2019 | Ducrou | G06V 20/54 |
| 10,664,795 B1 | 5/2020 | Worley | |
| 10,776,750 B2 * | 9/2020 | Lindbo | G06Q 30/0621 |
| 10,943,285 B1 * | 3/2021 | Grigsby | H04W 4/35 |
| 11,074,547 B2 | 7/2021 | Rajkhowa | |
| 11,823,123 B2 | 11/2023 | Rajkhowa | |
| 2003/0146274 A1 | 8/2003 | Pfutzenreuter | |
| 2003/0177072 A1 | 9/2003 | Bared | |
| 2003/0204431 A1 * | 10/2003 | Ingman | G06Q 10/063116 705/7.26 |
| 2004/0068443 A1 * | 4/2004 | Hopson | G06Q 10/08 705/5 |
| 2004/0153379 A1 * | 8/2004 | Joyce | G06Q 10/08 705/28 |
| 2004/0183751 A1 * | 9/2004 | Dempski | G02B 27/017 345/8 |
| 2005/0043850 A1 | 2/2005 | Stevens | |
| 2005/0149495 A1 | 7/2005 | Goldschlager | |
| 2005/0209902 A1 * | 9/2005 | Iwasaki | G06Q 10/06316 705/7.14 |
| 2005/0278062 A1 * | 12/2005 | Janert | G06Q 10/08 700/214 |
| 2006/0020366 A1 * | 1/2006 | Bloom | G06Q 20/00 700/226 |
| 2006/0200264 A1 * | 9/2006 | Kodama | G06Q 10/087 700/121 |
| 2007/0067200 A1 * | 3/2007 | Patel | G06Q 10/063114 705/7.14 |
| 2007/0083283 A1 * | 4/2007 | Ara | G06Q 10/063 700/111 |
| 2007/0244758 A1 | 10/2007 | Xie | |
| 2008/0162242 A1 * | 7/2008 | Schneur | G06Q 10/06316 705/7.14 |
| 2009/0063035 A1 * | 3/2009 | Mandel | G06F 30/18 701/437 |
| 2009/0082902 A1 * | 3/2009 | Foltz | G06Q 10/087 700/214 |
| 2009/0094087 A1 * | 4/2009 | Chung | G06Q 10/08 705/7.11 |
| 2009/0157472 A1 | 6/2009 | Burazin | |
| 2009/0164041 A1 * | 6/2009 | Geng | G06Q 10/08 700/214 |
| 2009/0288030 A1 * | 11/2009 | Wahl | G06Q 10/06 718/100 |
| 2010/0010902 A1 | 1/2010 | Casey | |
| 2010/0282520 A1 | 11/2010 | Lucas | |
| 2010/0287025 A1 * | 11/2010 | Fletcher | G06Q 10/06 705/7.15 |
| 2010/0316470 A1 | 12/2010 | Lert | |
| 2011/0035247 A1 * | 2/2011 | Perry | G06Q 10/06 705/7.38 |
| 2011/0208556 A1 * | 8/2011 | Nagahara | G06Q 10/06 705/7.14 |
| 2012/0029963 A1 * | 2/2012 | Olding | G06Q 10/06311 705/7.14 |
| 2012/0078673 A1 * | 3/2012 | Koke | G06Q 10/06311 705/26.81 |
| 2012/0101627 A1 | 4/2012 | Lert | |
| 2012/0124591 A1 * | 5/2012 | Cadambi | G06F 9/505 718/103 |
| 2012/0150340 A1 | 6/2012 | Suess | |
| 2012/0330458 A1 | 12/2012 | Weiss | |
| 2013/0103442 A1 * | 4/2013 | Burks | G06Q 10/06311 705/7.13 |
| 2013/0311875 A1 * | 11/2013 | Pappas | G06F 40/143 715/234 |
| 2013/0317642 A1 | 11/2013 | Asaria | |

(56) References Cited

U.S. PATENT DOCUMENTS

| | | | |
|---|---|---|---|
| 2013/0346204 A1 | 12/2013 | Wissner-Gross | |
| 2014/0003727 A1 | 1/2014 | Lortz | |
| 2014/0012612 A1* | 1/2014 | Abdic | G06Q 10/04 705/7.12 |
| 2014/0040075 A1* | 2/2014 | Perry | G06Q 30/0635 705/26.81 |
| 2014/0058794 A1 | 2/2014 | Malov | |
| 2014/0074745 A1* | 3/2014 | Nashif | G06Q 10/04 705/337 |
| 2014/0136255 A1* | 5/2014 | Grabovski | G06Q 10/063114 705/7.14 |
| 2014/0149172 A1* | 5/2014 | Rogut | G06Q 10/06316 705/7.26 |
| 2014/0156553 A1* | 6/2014 | Leach | G06Q 10/08355 705/337 |
| 2014/0172739 A1 | 6/2014 | Anderson | |
| 2014/0195295 A1* | 7/2014 | Whitley | G06Q 10/0633 705/7.27 |
| 2014/0214469 A1* | 7/2014 | Callow | G06Q 10/063114 705/7.15 |
| 2014/0257553 A1 | 9/2014 | Shakes | |
| 2014/0278627 A1* | 9/2014 | Grabovski | G06Q 10/06316 705/7.26 |
| 2014/0278638 A1* | 9/2014 | Kreuzkamp | G06Q 10/06398 705/7.15 |
| 2014/0279294 A1* | 9/2014 | Field-Darragh | H04B 5/77 705/28 |
| 2014/0324491 A1 | 10/2014 | Banks | |
| 2014/0330605 A1* | 11/2014 | Connolly | G06Q 10/063116 705/7.16 |
| 2014/0336814 A1 | 11/2014 | Moore | |
| 2014/0350710 A1 | 11/2014 | Gopalakrishnan | |
| 2014/0351101 A1 | 11/2014 | Danelski | |
| 2015/0051994 A1 | 2/2015 | Ward | |
| 2015/0081088 A1 | 3/2015 | Lyon | |
| 2015/0106145 A1* | 4/2015 | Hamilton | G06Q 10/063114 705/7.15 |
| 2015/0120514 A1* | 4/2015 | Deshpande | G06Q 30/016 705/28 |
| 2015/0170256 A1 | 6/2015 | Pettyjohn | |
| 2015/0192774 A1* | 7/2015 | Watanabe | G06Q 10/08 345/8 |
| 2015/0199641 A1* | 7/2015 | Napoli | G06Q 10/063114 705/7.15 |
| 2015/0242918 A1* | 8/2015 | Mccarthy | G06Q 30/0635 705/26.43 |
| 2015/0262114 A1* | 9/2015 | Ming | G06Q 10/063114 705/7.15 |
| 2015/0294260 A1 | 10/2015 | Napoli | |
| 2015/0310447 A1 | 10/2015 | Shaw | |
| 2015/0332213 A1* | 11/2015 | Galluzzo | B25J 15/0085 700/218 |
| 2016/0009493 A1* | 1/2016 | Stevens | B65G 1/1373 700/216 |
| 2016/0078523 A1* | 3/2016 | Lopez | G06Q 10/087 705/26.81 |
| 2016/0140488 A1 | 5/2016 | Lindbo | |
| 2016/0148303 A1* | 5/2016 | Carr | G06Q 30/0635 705/26.81 |
| 2016/0176637 A1 | 6/2016 | Ackerman | |
| 2016/0189076 A1* | 6/2016 | Mellott | G06Q 10/06312 705/7.14 |
| 2016/0196524 A1* | 7/2016 | Ito | G06Q 10/10 705/7.14 |
| 2016/0203543 A1* | 7/2016 | Snow | G06Q 30/0635 705/26.81 |
| 2016/0217410 A1* | 7/2016 | Santos | G06Q 10/063114 |
| 2016/0223339 A1 | 8/2016 | Pellow | |
| 2016/0253740 A1 | 9/2016 | Goulart | |
| 2016/0292011 A1* | 10/2016 | Colson | G06F 9/5027 |
| 2016/0299782 A1 | 10/2016 | Jones | |
| 2016/0307149 A1* | 10/2016 | Jones | G06Q 10/087 |
| 2016/0350706 A1 | 12/2016 | Endries | |
| 2017/0024804 A1* | 1/2017 | Tepfenhart, Jr. | G06Q 30/0635 |
| 2017/0036798 A1 | 2/2017 | Prahlad | |
| 2017/0091704 A1* | 3/2017 | Wolf | G06Q 10/08 |
| 2017/0121114 A1 | 5/2017 | Einav | |
| 2017/0158431 A1 | 6/2017 | Hamilton | |
| 2017/0200108 A1 | 7/2017 | Au | |
| 2017/0206591 A1* | 7/2017 | Deshpande | G06Q 10/087 |
| 2017/0213186 A1* | 7/2017 | Grifoni | G06Q 10/087 |
| 2017/0220984 A1 | 8/2017 | Agarwal | |
| 2017/0228701 A1 | 8/2017 | Wosk | |
| 2017/0278041 A1* | 9/2017 | LaReau | G06Q 10/063114 |
| 2017/0278047 A1 | 9/2017 | Welty | |
| 2017/0278055 A1* | 9/2017 | Winkler | G06Q 10/08 |
| 2017/0285648 A1 | 10/2017 | Welty | |
| 2017/0323250 A1* | 11/2017 | Lindbo | G06Q 30/0621 |
| 2017/0337523 A1* | 11/2017 | Roach | G06Q 10/087 |
| 2018/0005173 A1 | 1/2018 | Elazary | |
| 2018/0025460 A1* | 1/2018 | Watanabe | G06Q 10/087 705/28 |
| 2018/0057264 A1* | 3/2018 | Wicks | B65G 1/1376 |
| 2018/0088586 A1* | 3/2018 | Hance | G06Q 10/08 |
| 2018/0096275 A1* | 4/2018 | Akutsu | H04W 4/02 |
| 2018/0096286 A1* | 4/2018 | Cook | G06Q 10/06316 |
| 2018/0137452 A1 | 5/2018 | Khatravath | |
| 2018/0158016 A1* | 6/2018 | Pandya | G05B 19/41895 |
| 2018/0182054 A1* | 6/2018 | Yao | G06Q 10/063112 |
| 2018/0204169 A1* | 7/2018 | Cao | G06Q 10/087 |
| 2018/0240060 A1* | 8/2018 | Graham | G06Q 10/06314 |
| 2018/0240181 A1* | 8/2018 | Lopez | G06Q 10/00 |
| 2018/0247369 A1* | 8/2018 | Smith | G06Q 30/0635 |
| 2018/0276591 A1* | 9/2018 | Kim | G06Q 10/063114 |
| 2018/0300680 A1 | 10/2018 | Undernehr | |
| 2018/0314991 A1 | 11/2018 | Grundberg | |
| 2018/0319592 A1 | 11/2018 | Yamashita | |
| 2018/0341891 A1* | 11/2018 | Setchell | G06Q 10/10 |
| 2018/0342031 A1 | 11/2018 | Tada | |
| 2018/0364719 A1* | 12/2018 | Wang | G06F 16/22 |
| 2019/0057347 A1* | 2/2019 | Vitek | G06Q 10/0834 |
| 2019/0236525 A1 | 8/2019 | Stanley | |
| 2019/0266552 A1* | 8/2019 | Gupta | G06Q 30/0201 |
| 2019/0279426 A1* | 9/2019 | Musunuri | G06V 20/20 |
| 2019/0294841 A1* | 9/2019 | Hall | G06Q 10/08 |
| 2019/0300285 A1 | 10/2019 | Cheng | |
| 2019/0333011 A1* | 10/2019 | Wen | G06Q 30/0633 |
| 2019/0384280 A1 | 12/2019 | Osawa | |
| 2019/0389659 A1 | 12/2019 | Grinnell | |
| 2020/0039747 A1 | 2/2020 | Ahmann | |
| 2020/0043080 A1 | 2/2020 | Shi | |
| 2020/0302391 A1* | 9/2020 | Li | G06Q 10/0875 |
| 2020/0311644 A1 | 10/2020 | Willard, III | |
| 2021/0269244 A1 | 9/2021 | Ahmann | |

OTHER PUBLICATIONS

Cristiano Arbex Valle, John E Beasley, Alexandre Salles da Cunha, "Optimally solving the joint order batching and picker routing problem" Mar. 19, 2017, Brunel University Mathematical Sciences, UK (Year: 2017).*

Z. Zhao and P. Yang, "Improving order-picking performance by optimizing order batching in multiple-cross-aisle warehouse systems: A case study from e-commerce in China," 2017 4th International Conference on Industrial Engineering and Applications (ICIEA), Nagoya, Japan, 2017, pp. 158-162, (Year: 2017).*

Hong, Soondo, Andrew L Johnson, and Brett A Peters. "Order Batching in a Bucket Brigade Order Picking System Considering Picker Blocking." Flexible services and manufacturing journal 28.3 (2016): 425-441. Web. (Year: 2016).*

"Picking Technology." Material Handling Product News 36.3 (2014): 22-. Print. (Year: 2014).

Bartholdi, III, et al., Warehouse & Distribution Science Release 0.96, The Supply Chain and Logistics Institute School of Industrial and Systems EngineeringGeorgia Institute of Technology Atlanta, GA 30332-0205 USA Revised Aug. 19, 2014.

Changpeng Shen, Yaohua Wu and Danyu Zhang, "A selection method of manual and semi-automated order picking systems based on filling curve and time model," 2010 IEEE International Confer-

(56) References Cited

OTHER PUBLICATIONS ence on Automation and Logistics, Hong Kong, China, 2010, pp. 169-176, doi: 10.1109/ICAL.2010.5585274. (Year: 2010).

G Pedrielli, A. Vinsensius, E. P. Chew, L. H. Lee, A. Duri and Haobin Li, "Hybrid order picking strategies for fashion E-commerce warehouse systems," 2016 Winter Simulation Conference (WSC), Washington, DC, USA, 2016, pp. 2250-2261, doi: 10.1109/WSC.2016.7822266. (Year: 2016).

International Search Report and Written Opinion for Application No. PCT/US2019/027639, dated Jul. 5, 2019, 9 pages.

Merschformann, M., Lamballais, T., Koster, R., & Suhl, L. (2018). Decision Rules for Robotic Mobile Fulfillment Systems. ArXiv, abs/1801.06703. (Year: 2018).

Sundaram, Ramakrishnan. "An Order Batching and Processing Heuristic to Address Aisle Congestion in a Manual Order Picking Warehouse with Order Due Dates." ProQuest Dissertations Publishing, 2004. Print. (Year: 2004).

U.S. Appl. No. 16/040,910; Notice of Allowance filed Mar. 29, 2021.

U.S. Appl. No. 16/040,910; Office Action filed Jun. 8, 2020.

U.S. Appl. No. 16/040,910; Office Action filed Oct. 30, 2020.

U.S. Appl. No. 17/383,977; Non-Final Rejection filed May 9, 2023; (pp. 1-33).

U.S. Appl. No. 17/383,977; Notice of Allowance and Fees Due (PTOL-85) filed Jul. 10, 2023; (pp. 1-10).

Valle, Cristiano Arbex, John E. Beasley, and Alexandre Salles Da Cunha. Optimally solving the joint order batching and picker routing problem. European Journal of Operational Research 262.3 (2017): 817-834. (Year: 2017).

Venkatadri et al., Estimating Travel Distances and Optimizing Product Placement for Dedicated Warehouses with Manual Picking, Department of Industrial Engineering Dalhousie University Halifax, Nova Scotia, B3J 2X4, Canada, pp. 1-14; Jun. 2012.

\* cited by examiner

SYSTEMS AND METHODS FOR DUAL OPTIMIZATION OF PICK WALK AND TOTE FILL RATES FOR ORDER PICKING

RELATED APPLICATION

This application is a continuation of U.S. application Ser. No. 17/383,977, filed Jul. 23, 2021, which is a continuation of U.S. application Ser. No. 16/040,910, filed Jul. 20, 2018, now U.S. Pat. No. 11,074,547, which claims priority to Indian Patent App. No. 201811015004, filed Apr. 20, 2018, the entire contents of all of which are incorporated herein by reference.

BACKGROUND

In the area of order fulfilment such as e-commerce, arriving customer orders can be held and distributed simultaneously to pickers in a facility in one or more batches. The pickers collect items in the orders from item locations within the facility and bring the items to a central location where they are organized, packed, and shipped to customers.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
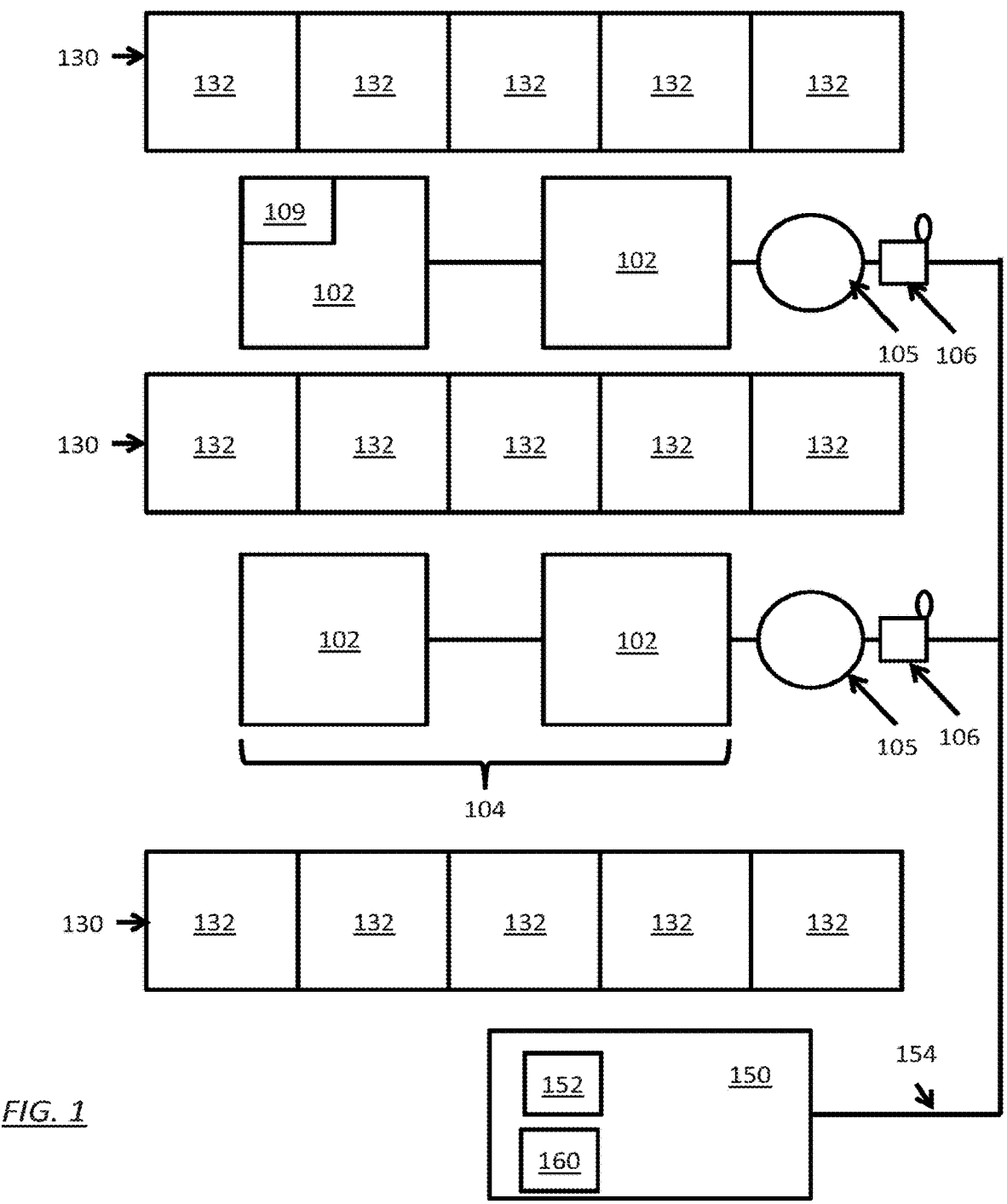
FIG. 1 illustrates a system for dual optimization of pick walks and tote fill rates for order picking in an exemplary embodiment.

Described in detail herein are methods, systems, and computer-readable media for dual optimization of pick walk and tote fill rates in order picking. As disclosed herein, the systems, methods, and computer-readable media provide improved order picking speed and quality by optimizing pick routing with consideration of both item proximity constraints and tote value constraints. Tote value constraints can include, but are not limited to, constraints on carrying capacity, volume, size in a particular dimension, or weight capacity.

At a facility, customer orders are received piecemeal for differing time periods and are assigned in batches to pickers to be collected and assembled. In conventional systems, the number of orders in a batch is generally divided by the number of available pickers, and each picker receives an equal number of orders in an essentially random manner. For example, the pickers can be assigned a tranche of orders based on timestamp of order receipt or the orders can be assigned in a round-robin fashion. By distributing orders this way, some pickers may receive a number of very large orders (i.e., orders containing many items) or orders containing very large items (i.e., items that occupy a large volume or that have a large weight) while other pickers receive mostly smaller orders. Not only does this unfairly burden some pickers, but it introduces additional delays to the order picking process. In particular, the picker having orders with many items or large volume items must return multiple times to an order assembly station to empty his or her totes as they become full. The time for the picker to travel to and from the order assembly station partway through a pick walk introduces significant time to the order picking process.

Embodiments described herein address these issues by performing dual optimization of the pick list for each picker when assigning order batches taking into account both item proximity constraints and tote value constraints so that each picker can minimize returns to the order assembly station and the orders are processed in an expeditious manner.

As used herein, an "order" refers to a group of items requested by a customer. In some embodiments, orders received from customers are collected over time and are batched to pickers to be picked at discrete points in time rather than continuously.

As used herein, an "item list," or "picklist" is the list of items provided to a picker to be picked in the facility and returned to a service station for sorting and/or packing into final customer shipments. The picker engages in a pick walk to collect the items in his or her order batch from around the facility and to return the items to a service station.

As used herein, a "batch" or "order batch" refers to items from one or more orders assigned to a picker. It will be appreciated that a picklist for a picker may initially contain items for only a single order and the single order may include items assigned to multiple pickers (e.g. for a single order, one picker may handle picking perishable grocery items while another picker may retrieve frozen grocery items and a third picker may retrieve general merchandise items. By carefully selecting the items that go into each picker's order batch, embodiments can simultaneously optimize based on item proximity for the pick walk as well as tote fill constraints for order picking.

As used herein, a "wave" refers to a single cycle of assigning order batches to pickers to be collected and packaged for delivery to customers. All parts of a single customer order are assigned as part of the same wave so that each wave is self-contained and no partially-completed orders are carried to the next wave. In one non-limiting example, orders received from 10:01 AM until 4:00 AM the following day may be aggregated and released as a wave at 4:00 AM and orders received between 4:01 AM and 10:00 AM may be aggregated and released as a second wave at 10:00 AM (after optimization as described herein). Each order may be assigned a due time and associated with a delivery vehicle. Within the due time order items may be divided by commodity type to reflect different locations within a facility.

FIG. 1 illustrates a system 100 for dual optimization of pick walks and tote fill rates for order picking in an exemplary embodiment. The system 100 includes multiple totes 102. Each tote 102 has a physical capacity associated with it. The system 100 also includes multiple carts 104 that are each configured to support some number of totes 102. Each cart 104 can be operated by a picker 105 having a mobile device 106. The system 100 also includes a server 150 communicatively coupled to a database 152 holding information regarding each item in a facility. The server 150 can transmit an assigned batch of items for picking from the facility to the mobile device 106 of each picker 105. Each picker 105 then travels around the facility to collect the items in the assigned batch and places the items into totes 102 in their cart 104. Once the assigned batch of items has been picked, the picker 105 can deliver the cart 104 to a service station where the items are prepared for shipping to customers. The system 100 can assign items to batches by considering both item proximity constraints and tote value constraints to efficiently allocate orders among all pickers.

In an embodiment, multiple totes 102 can have an assigned physical capacity. For example, the physical capacity can be, but is not limited to, a maximum height, maximum width, maximum length, maximum volume, or maximum weight capacity. In some embodiments, a first tote 102 can have a different capacity than a second tote 102 on the cart 104. In some embodiments, the totes 102 can be separate bins or shelves or can be partitioned areas within one or more large bins or shelf areas on the cart 104. If the totes 102 are physically separated bins, the cart 104 can include a linking mechanism such as a hitch to allow the totes 102 to connect in a modular fashion to the cart 104.

In some embodiments, one or more totes 102 can include a sensor 109 to detect the total weight or volume of items within the tote 102. For example, the sensor 109 can be a weight scale. In some embodiments, the sensor 109 can measure properties of the totes indirectly such as through measurements of the cart 104 (e.g., measurement of the total weight of all totes 102 by measuring the weight of the cart 104). In some embodiments, the cart 104 or totes 102 can include a sensor to detect position of the cart 104 within the facility. The position detection sensor can include a global positioning device or a beacon that interacts with transmitters throughout the facility in various embodiments. In an embodiment, tote 102, cart 104 or sensor 109 may be equipped with a communication capability via long or short-range wireless protocols enabling communication of sensor data with server 150 and/or mobile device 106.

In an embodiment, sensor 109 may include a scanning capability such that it can scan machine-readable identifiers on items being placed into the tote. The machine-readable identifier may be used to retrieve item characteristic information such as, but not limited to, size, dimension, and weight from database 152. In one embodiment, the scanned identifier may also be used by the system to determine progress on a picklist/order batch assigned to picker 105.

In various embodiments, the cart 104 can be motorized or non-motorized. The cart 104 can be driven, pushed, or pulled by the picker. The cart 104 can include modular sections that can be associated or disassociated to allow for rapid reconfiguration of totes among carts (e.g., to add additional totes to carts or to reduce the number of totes in the cart).

The mobile devices 106 that are associated with each picker 105 can include mobile communications modules to allow the mobile device 106 to communicate with the server 150 via communications link 154. The communications link 154 can include wired connections, wireless connections, or both. In some embodiments, the mobile devices 106 can include a communications component that can interface with the server 150 using one or more communication technologies, such as, but not limited to, Bluetooth®, Wi-Fi, cellular and near-field communications technologies. In some embodiments, the mobile device 106 can be a smartphone or tablet computer. In some embodiments, the mobile device 106 can include a display. The display can display information to the picker such as order status, item pick status, order escalation information, or location of next item or subsequent items within the facility.

An exemplary embodiment of the server 150 is described in greater detail below with respect to FIG. 4. The server 150 can receive multiple orders and is configured to execute an item list optimization module 160. Each order in the plurality of orders can include one or more items. Item list optimization module 160 can determine an order batch to be picked for each of the pickers 105. When the item list optimization module 160 is executed, the server 150 takes several actions including determining an order batch for each picker. The operations of the item list optimization module 160 are described further below. The order batch for each picker 105 can include items associated with one or more of the orders. Item list optimization module 160 transmits the determined order batches to the pickers 105 via each picker's mobile device 106.

The database 152 can hold information regarding each item in the facility. In some embodiments, the database 152 can include information related to the weight of each item and/or can include information related to a dimension of each item such as height, weight, length, or volume. In various embodiments, the database 152 can include one physical dimension, two physical dimensions, three physical dimensions, or more for each item. The database 152 may have complete information for some items and incomplete information for other items. In some embodiments, the database 152 can include only the largest dimension for each item.

In some embodiments, the database 152 can include information related to the location of the item in the store. For example, items can be associated in the database with a sequence number that is unique to a shelving unit 132 within the facility where the item is located. In some embodiments, the sequence number or an additional related piece of metadata can convey additional information such as the location of the item within a component 132 of the shelving unit 130. For example, the sequence numbers can increase from left to right and from top to bottom with the component 132 of the shelving unit 130 in some embodiments. When each item is associated with a sequence number in the database 152, item list optimization module 160 can determine pick order for items that appear in an order batch by arranging the items sequentially in order of sequence number. Relatedly, the items can be organized in the list by order of how they appear on the component 132 of the particular shelving unit 130 (e.g., top to bottom, left to right) so that the picker only needs to scan across the component 132 one time to gather all items in the order batch that reside on that component 132.

Item list optimization module 160 attempts to minimize total trip time by creating N batches of variable orders each (based on commodity type) for a due time and commodity type such that the total trip time is global across all such trips. The module begins with one customer order as a single batch then for each other customer order uses proximity to determine whether it is favourable to pick other orders separately or to add them into one of the already existing batches not violating the trolley/cart capacity. The output is batch orders with maximum overlapping of items thereby increasing the density of pick-up points until the capacity of the tote/trolley is exhausted.

To determine the order batch to be picked for each of the pickers, the item list optimization module 160 can assign items from a first order as a first batch to a first picker. In some embodiments, this step initializes the determination process. In a preferred embodiment, the picker is in charge of a cart/trolley holding a specified number of totes (e.g. 8) each with a known physical capacity. In one embodiment each tote holds only items for a single order so as to avoid the need for sorting items in the tote into different orders at the service center after the pick walk has been completed. As explained further herein however multiple orders may exist in separate totes on the same cart/trolley. It will be appreciated that in an alternative embodiment, the prohibition against mixing items from different orders can be omitted although this will require an extra sorting step after the pick walk before delivery. The first order can be the largest order (i.e., most items) or the earliest-received order in various embodiments. The item list optimization module 160 can then perform an optimization determination based on proximity constraints and tote value constraints for each additional order. The optimization determination decides whether the items from an additional order are added to an existing batch or are assigned to a new batch. In some embodiments, the tote value constraints can be based on the weight and size attributes of items in the order and the physical capacity of each tote and constraints associated with the cart/trolley (e.g.: maximum weight).

In deciding whether items from an additional order are added to an existing batch during the optimization determination, the item list optimization module 160 can operate under a variety of assumptions and considerations. For example, the assigned order batch for each picker 105 should be less than or equal to the capacity of all of the totes 102 in the cart 104. Additionally, all of the items in any single order may be batched to a picker or pickers as part of the same wave. By forcing all items for a customer order to be picked in the same wave, the server 150 ensures that each wave is self-contained and avoids the need to account for partially picked orders in subsequent waves. This limitation also ensures that the process for each order from picking to packing is completed in a timely fashion.

Proximity constraints play a role in the optimization determination. The proximity constraints can be based on location information for items in the database 152 in some embodiments. The item list optimization module 160 can use several assumptions and considerations when optimizing batches for each picker. The optimization determination can include calculations of total trip walk for each picker to walk between items and total trip walk for all pickers. The forward walk (i.e., the walk from the service station to the first item) and the last walk (i.e., the walk from the last item back to the service station) can be significant but can be treated as a constant. The inter-item walk can be a significant portion of the walk and can be taken into consideration. In some embodiments, the item list optimization module 160 can calculate the inter-item walk based upon a difference of item sequence numbers. For example, items can be assigned sequence numbers based upon a location of the component 132 of the shelving unit 130 at which the item can be found within the facility. If item A and item B are at sequence numbers 1 and 7, respectively, the distance between items A and B is 6 units. The seek time for items at each item location is treated as constant for the first item but can be assigned as zero seconds for subsequent items at the same location. Similarly, the retrieval time of items from the shelving units 130 can be treated as insignificant by setting the retrieval time to zero in some embodiments.

In some embodiments, proximity constraints can include filtering of the items in the multiple orders by zone. The items can then be batched to pickers by zone. For example, pickers can be limited to operating within a specific zone to prevent the picker from having to walk long distances through the facility to gather items from all sections of the facility. It can be advantageous in some embodiments to first filter items in the orders into zones and then use the item list optimization module 160 to perform optimization determination for pickers within the zone. In some embodiments, each zone can be organized to emphasize a different commodity, e.g., grocery items, hardware items, or refrigerated items.

Tote value constraints play a role in the optimization determination. In some embodiments, assessment of tote value constraints is made using weight and size attributes for items and the physical capacity of each tote. It is desirable to allocate items to totes such that the capacity of each tote is used most efficiently. For example, the items allocated to a given tote should fit within the tote without surpassing the weight constraint for the tote and without leaving unused capacity within the tote. By using the full capacity of the tote, the total number of trips made by all pickers to retrieve items may be reduced. By incorporating tote value constraints into the optimization determination, the optimization determination can avoid allocating totes with more items than they can hold which would have the undesirable effect of creating multiple trips by the picker to the service station to unload the items. It will be appreciated that the same considerations apply to cart/trolley constraints which are also taken into consideration by the item list optimization module.

In one embodiment, an additional constraint involves physical characteristics of the picker. Pickers meeting certain physical criteria may be allocated additional weight to push for their cart/trolley by the item list optimization module. For example, a picker who is 6 feet 2 inches tall and weighs 200 pounds may be assigned a picklist with heavier items than a picker who is 5 foot 3 inches and 110 pounds. Database 152 may hold physical characteristic information for each picker that may be used by item list optimization module.

Figure 2:
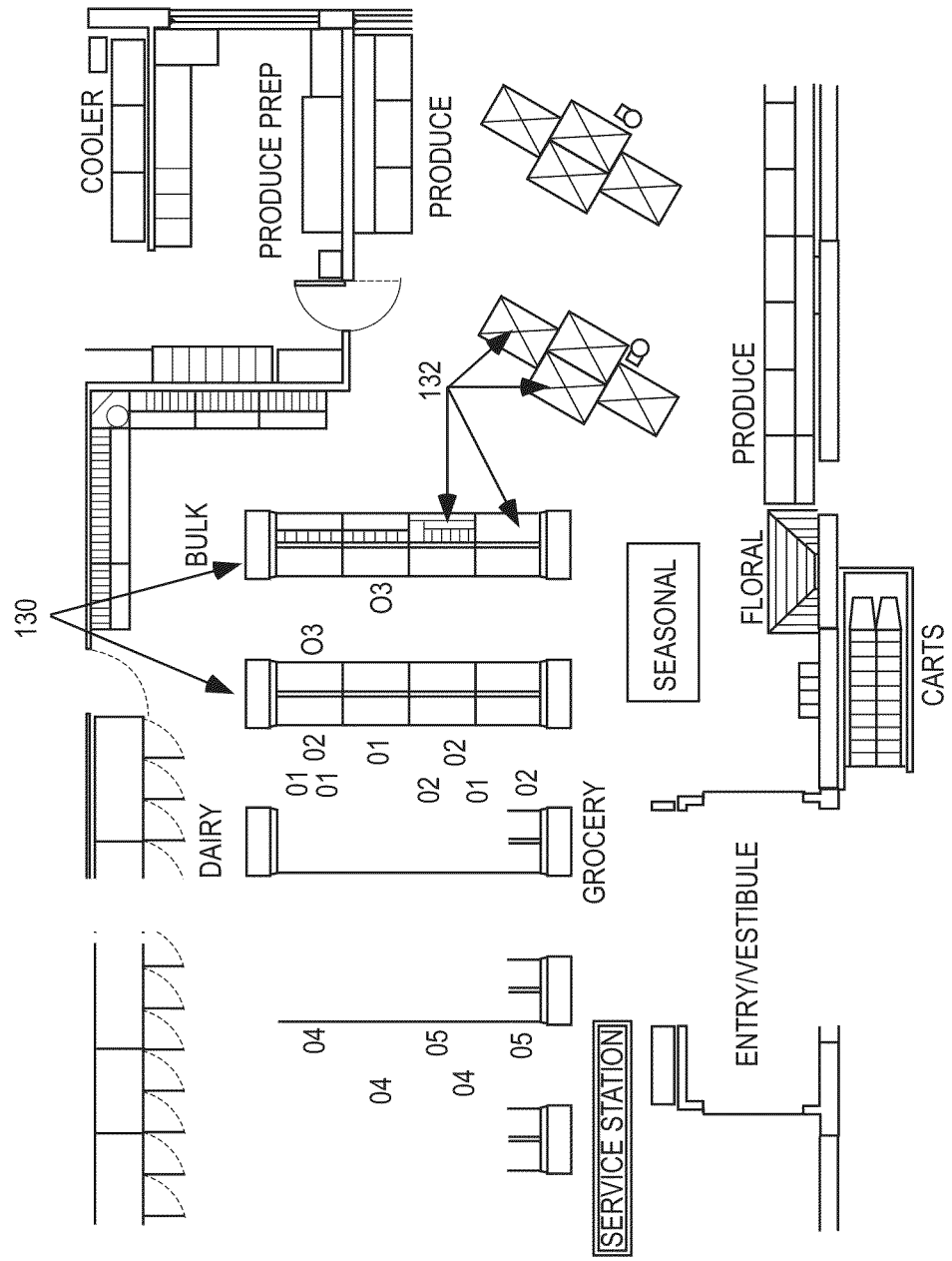
FIG. 2 illustrates a view of a facility including shelving units in an exemplary embodiment.

FIG. 2 illustrates a view of a facility including shelving units 130 in an embodiment. To better illustrate the advantages of systems and methods described herein, FIG. 2 includes example locations of items from five customer orders labeled O1-O5. The labels are shown next to the component 132 of the shelving unit 130 at which the item resides. In the simplest situation, the items in all five orders do not violate tote value constraints for the totes 102 associated with the cart 104 for a single picker and can fit within the totes without mixing orders. In that case, the items can be batched to a single picker who travels through the facility collecting items for all five orders.

In a more complicated scenario, at least some of the items in orders 1 and 2 (O1 and O2) are of large volume or weight while the items in orders 3, 4, and 5 are generally of smaller volume or weight. In conventional systems that rely solely on proximity, orders 1 and 2 may be batched together to a picker because the proximity overlap is large (i.e., the items in orders 1 and 2 are found similar or the same shelving units 130). However, a picker attempting to collect all items for orders 1 and 2 finds that the capacity of his or her totes is exceeded before all of the items are collected. Therefore, the picker will have to return to the service station to empty the totes and return to the same area to finish collection. The additional time for the picker to transit to and from the service station can be significant and can adversely increase the total time for all pickers to collect items. As such, in the present invention, the item list optimization module 160 can batch order 1 with order 3 for a first picker so that the tote value constraints (or other constraints) are not violated for the first order batch. Then, orders 2, 4, and 5 can be batched together and assigned to a second picker (or to picker 1 after completing the first batch if the time constraint may still be accommodated) so that the tote value constraints are not violated for the second order batch. Although the overall walk for each picker may be increased slightly by having to walk further to gather items, the sum of the times for both pickers to pick their order batches is still minimized because of the avoidance of the extra time to walk back and forth to the service station to unload overfull totes.

Volume constraints for totes may be applied in a number of different ways. For example, in some embodiments the constraints may be applied as "split" and "no split." In a no split approach, the item list optimization module moves complete orders into different pick walks to see what combinations minimize the pick walk. In a split approach, the item list optimization module creates full totes of orders and move totes around into different pick walks to see what combinations minimize pick walks. The item list optimization module includes load capacity constraints to generate split orders or the maximum split limits.

In various embodiments, the joining (or clubbing) of orders to totes can include several iterative operations on the part of the item list optimization module 160. The item list optimization module 160 can first sort all items in each order by sequence number from lowest to highest. The item list optimization module 160 can then associate a first tote with items from a first order from lowest to highest sequence until the tote value constraints are violated. If the assignment of all items in the first order does not violate tote value or other constraints, and additional physical capacity exists on the cart, items from a second order can be added to an available tote for that picker. If the assignment of items in the first order does violate tote value constraints for the first tote, the item list optimization module 160 can begin to assign items to subsequent totes. Whenever assignment of items from an order violates tote value constraints, the item list optimization module 160 can engage in a backfill process. In the backfill process, the item list optimization module 160 attempts to assign items that could not be assigned to the current tote to a previous tote for that order. For example, if the item list optimization module 160 cannot assign an item to the second tote without violating tote value constraints, the module 160 can attempt to assign the item to the first tote to see if the tote value constraints for the first tote are violated. In this way, space usage on the cart is maximized. Further, items from later-assigned orders may still be clubbed to the same order batch by backfilling empty space in available totes. In one embodiment, there may be more than one earlier tote that can accept the item from the later-assigned order in which case the item list optimization module 160 can assign the item to the tote that already has one or more items assigned with the most similar sequence number to the newly assigned item. As noted above, in some embodiments, the prohibition on mixing items from different orders within the same tote is not applied. In such a case, the backfill process described above can be used to add items from later (different) orders to totes with items form earlier orders.

In one embodiment, item list optimization module 160 can group items associated with a different totes to generate the order batches or picklists for each picker. The module 160 can select the first tote to add to the picklist as the tote with the smallest difference in sequence number among all pairs of items. In some embodiments, this tote is associated with the shortest pick walk distance. If more than one tote has the smallest sequence number, the module 160 can select the tote with assigned items on the highest number of shelving units 130. In this embodiment, the selected tote provides a superset of locations which increase the opportunity to combine subsequent totes with the selected tote in the order batch without significantly increasing the overall length of the pick walk. The item list optimization module 160 can then apply a proximity algorithm with respect to the selected tote's number of shelving unit visits or zone visits in some embodiments. Items associated with additional totes can then be added to this picker's picklist (i.e., additional tote assignments are added to this picker's cart) by comparing the number of common shelving units 130 for items assigned to each additional tote to the shelving units in totes already assigned to this picklist. As a secondary consideration, the module 160 can also judge the density of items within each shelving unit 130 for items assigned to each tote to determine whether the pick walk for the additional tote is comparable to the existing totes assigned to the picklist. By performing this comparison among all additional totes with existing totes assigned to the picklist, totes that are most similar in proximity can be clubbed to existing totes until the specified number of totes is reached (e.g., the maximum number of totes that the cart can accommodate safely is reached). Once the first picklist is complete, the process can begin again with the second picklist and the remaining unassigned totes.

In some embodiments, the item list optimization module 160 can perform transformations of the resulting order batches before the batches are transmitted to the pickers. In some embodiments, the item list optimization module 160 can perform a weight flip. In the weight flip, sequentially ordered items in the order batch are divided into two halves. If the total combined size attributes (e.g., weight) of the items in the second half is greater than the total combined size attributes of the items in the first half, the item list optimization module 160 can reverse the order of the pick list. By performing the weight flip, the item list optimization module 160 attempts to organize the pick list so that the picker gathers the heaviest items first. This is advantageous to avoid having later-picked heavy items from crushing earlier-picked lighter items when the items are in the tote.

In one embodiment, the logic for dividing an order into totes may be generally expressed as:
Step 1: Items of each order are sorted by sequence number/location from lowest to highest in a linear line.
Step 2: Open a tote.
Step 3: Fill the tote with items, from lowest to highest sequence number till tote weight/volume constraint breaks. If it breaks, back fill.
Step 4: Backfill—For every new item look at empty space in all previous totes. If there are 2 totes that have empty space, pick a tote whose highest sequence number is closest to the item's sequence number.

In an embodiment, the logic for the process of grouping totes into picklists may be generally expressed as:
Step 1: Open a picklist.
Step 2: Select the first tote as the tote with the smallest sequence number. If there is a conflict then pick the tote that has the highest aisle visits. (This provides a tote with a superset of locations thus increasing the possibility to combine future totes).
Step 3: Apply proximity algorithm with respect to a tote's number of zone-aisle visits.
Step 4: Add totes with the maximum number of common aisles to the totes already in the pick list. Check density of items in such totes/aisle combinations.
Step 5: Sort and pick the highest one till picklist constraints break.
Repeat: Then open another pick list.

Figure 3:
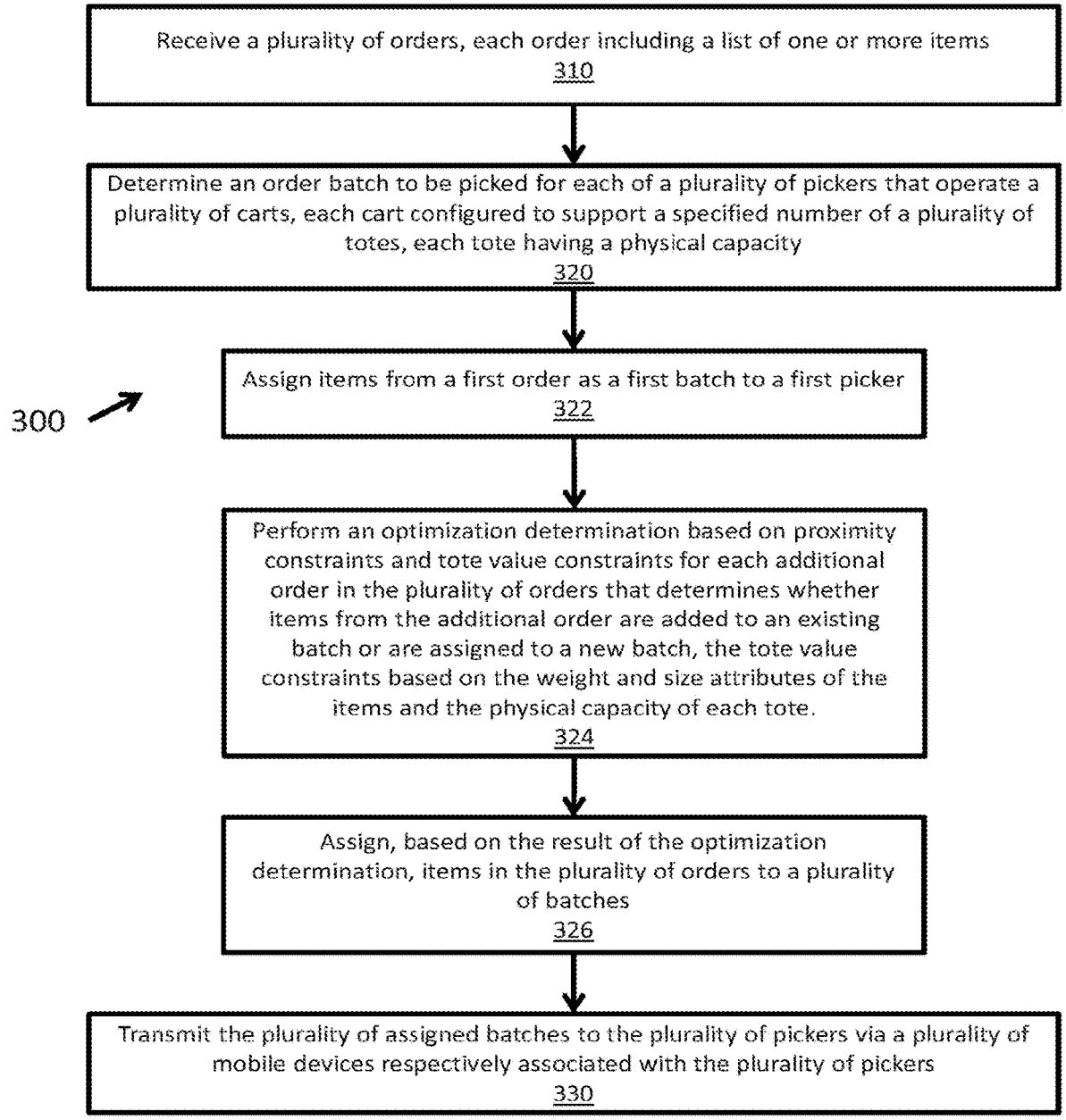
FIG. 3 illustrates an exemplary flowchart for a method for dual optimization of pick walks and tote fill rates for order picking in an exemplary embodiment.

FIG. 3 illustrates an exemplary flowchart for a method 300 for dual optimization of pick walks and tote fill rates for order picking in an example embodiment. The item list optimization module 160 can create batch orders for groups of pickers associated with zones (e.g., commodity types) such that the total trip time for all pickers across all trips is minimized in some embodiments. The method 300 can receive multiple orders with each order including a list of one or more items (step 310). The method 300 can determine an order batch to be picked for each of the pickers that operate of the carts (step 320). Each cart is configured to support a specified number of a plurality of totes, and each tote has a physical capacity. The determination in step 320 can further include assigning items from a first order as a first batch to a first picker (step 322). The determination in step 320 can further include performing an optimization determination based on proximity constraints and tote value constraints for each additional order in the plurality of orders that determines whether items from the additional order are added to an existing batch or are assigned to a new batch (step 324). The tote value constraints are based on the weight and size attributes of the items and the physical capacity of each tote. The determination in step 320 can further include assigning, based on the result of the optimization determination, items in the orders to batches (step 326). The method 300 includes transmitting the assigned batches to the pickers via mobile devices respectively associated with the pickers (step 330).

Figure 4:
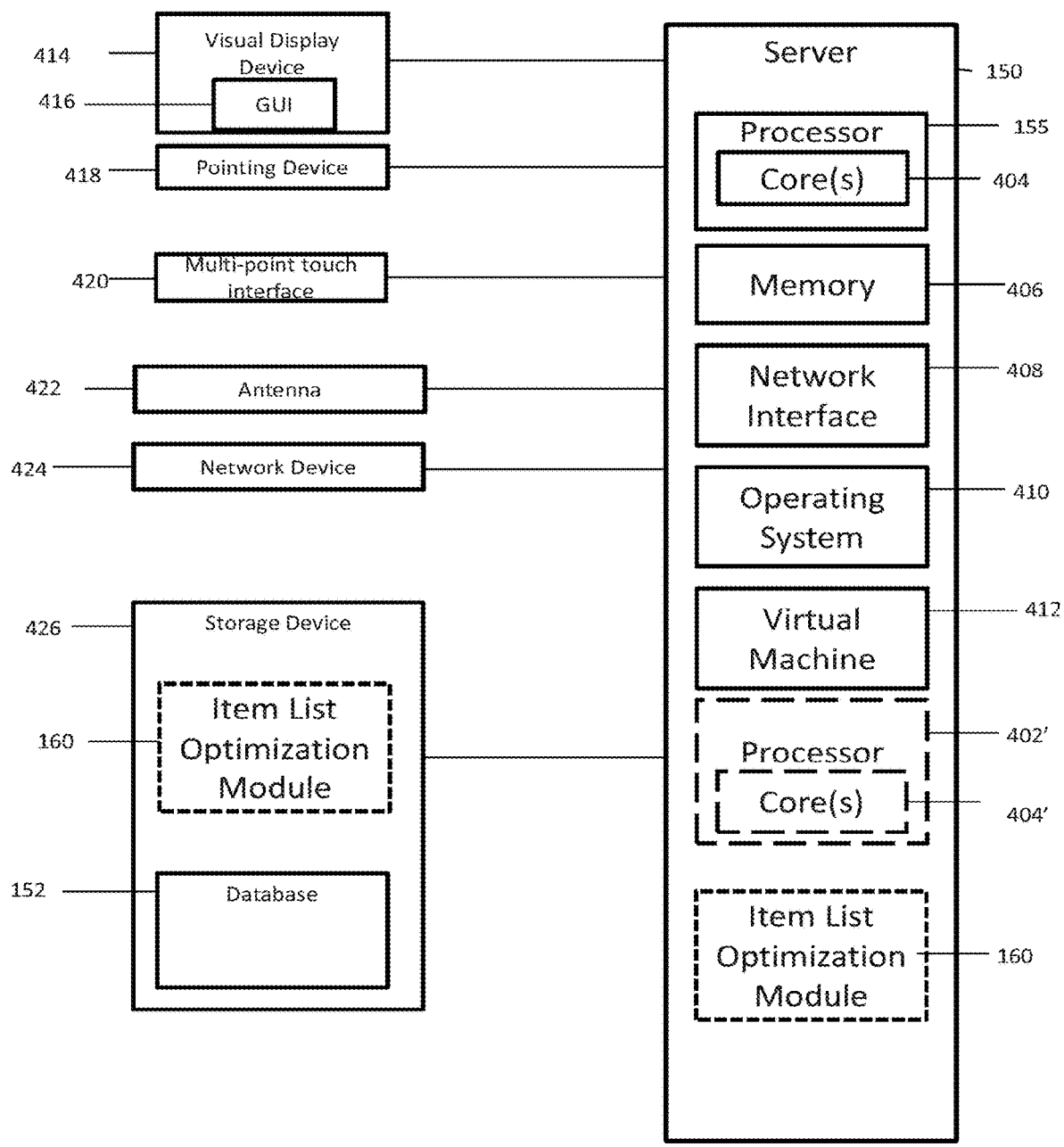
FIG. 4 is a block diagram of the example server 150 for implementing exemplary embodiments of the present disclosure.

FIG. 4 is a block diagram of the example server 150 for implementing exemplary embodiments of the present disclosure. The server 150 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the server 150 may store computer-readable and computer-executable instructions or software for implementing exemplary operations of the server 150. For example, the software can include the item list optimization module 160 or other executable instructions to perform the operations as described above with reference to FIGS. 1, 2 and 3. The software can also be stored in a storage device 426 as described below. The server 150 also includes configurable and/or programmable processor 155 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 155 and processor(s) 402' may each be a single core processor or multiple core (404 and 404') processor. Either or both of processor 155 and processor(s) 402' may be configured to execute one or more of the instructions described in connection with the server 150.

Virtualization may be employed in the server 150 so that infrastructure and resources in the server 150 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the server 150 through a visual display device 414, such as a computer monitor, which may display one or more graphical user interfaces 416, a multi-point touch interface 420 or a pointing device 418.

The server 150 may also include one or more storage devices 426, such as a hard-drive, CD-ROM, or other computer readable media, for storing data and computer-readable instructions and/or software that implement exemplary embodiments of the present disclosure. For example, exemplary storage device 426 can include the database 152 as described above with reference to FIGS. 1 and 2. The database 152 may be updated manually or automatically at any suitable time to add, delete, and/or update one or more data items in the databases. The storage device 426 can also store the item list optimization module 155 in some embodiments.

The server 150 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the server 150 can include one or more antennas 422 to facilitate wireless communication (e.g., via the network interface) between the server 150 and a network and/or between the server 150 and mobile devices 106 through the communications link 154. The network interface 408 may include a built-in network adapter, network interface card, PCMCIA network card, card bus network adapter, wireless network adapter, USB network adapter, modem or any other device suitable for interfacing the server 150 to any type of network capable of communication and performing the operations described herein.

The server 150 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the server 150 and performing the operations described herein. In exemplary embodiments, the operating system 410 may be run in native mode or emulated mode. In an exemplary embodiment, the operating system 410 may be run on one or more cloud machine instances.

Figure 5:
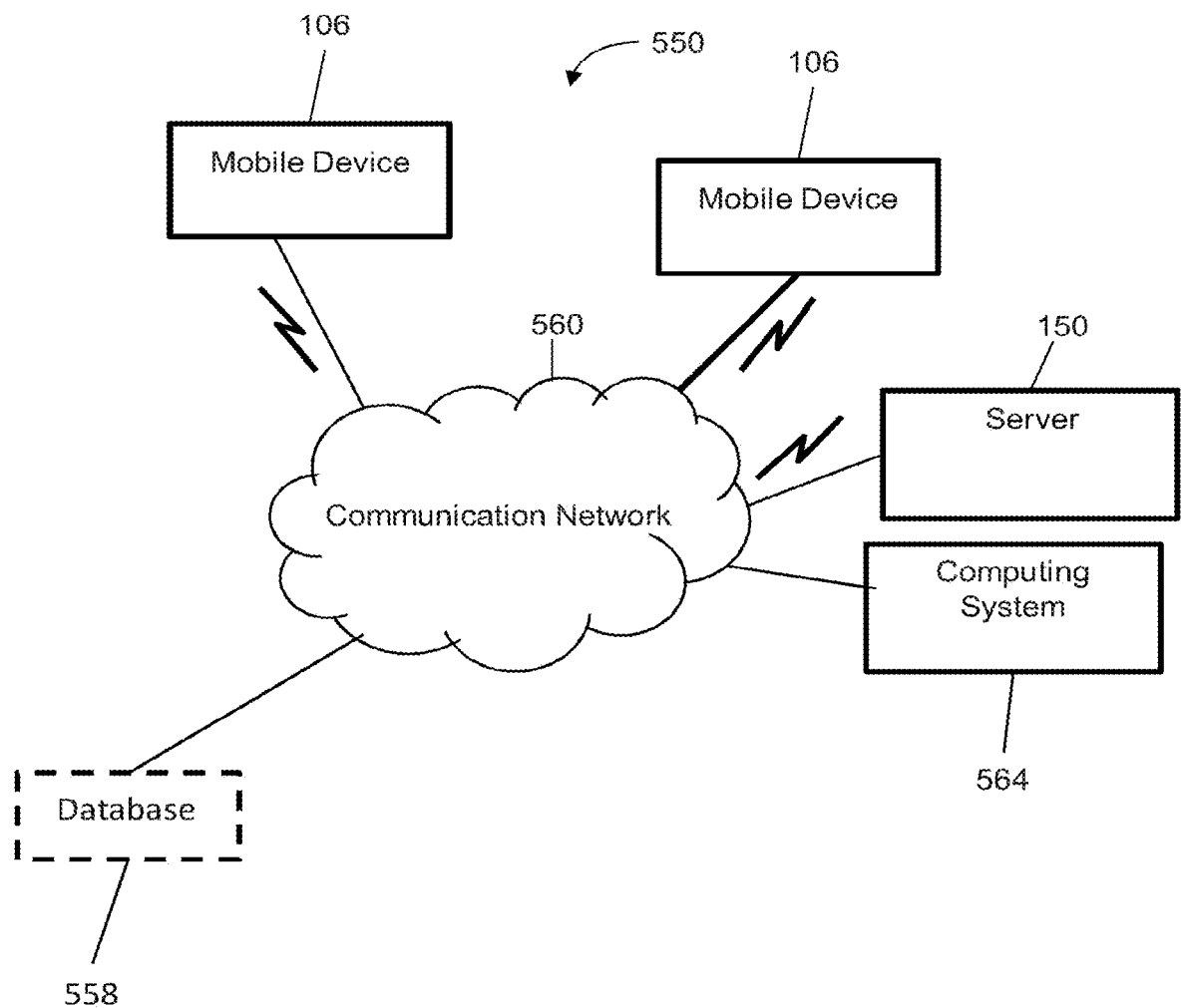
FIG. 5 is a block diagram of an exemplary distributed environment 550 in accordance with exemplary embodiments of the present disclosure.

FIG. 5 is a block diagram of an exemplary distributed environment 550 in accordance with exemplary embodiments of the present disclosure. The environment 550 can include the server 150 configured to be in communication with the plurality of mobile devices 106 via a communication network 560, which can be any network over which information can be transmitted between devices communicatively coupled to the network. For example, the communication network 560 can be the Internet, Intranet, virtual private network (VPN), wide area network (WAN), local area network (LAN), and the like. In some embodiments, the communication network 560 can be part of a cloud environment. The environment 550 can include at least one repository or database 152, which can be in communication with the server 150 and the mobile devices 106 via the communications network 560.

In exemplary embodiments, the server 150 and database 152 can be implemented on a stationary computing device or mobile device. Those skilled in the art will recognize that the database 152 can be incorporated into the server 150 such that the server 150 can include the database 152. In some embodiments, the database 558 can include computer-executable instructions or automated scripts that execute the item list optimization module 155.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for optimization of order picking, the system comprising:
   a plurality of totes, each tote having a physical capacity and used by one of a plurality of pickers to receive and store one or more items of an order;
   a storage device including:
      an electronic database holding information regarding items in a facility, the electronic database configured to store electronic data representing item proximity constraints and electronic data representing tote value constraints,
      an item list optimization module configured to determine order picking tasks and assign the order picking tasks to the pickers, the item list optimization module being configured to obtain the electronic data representing the item proximity constraints and the tote value constraints from the electronic database;
   a server communicatively coupled to the storage device and configured to execute the item list optimization module that, when executed:
      receives a plurality of orders, each order including a list of one or more items,
      determines an order batch to be picked by a plurality of pickers, each batch including items associated with one or more of the plurality of orders, the determining including:
         assigning items from a first order as a first batch to a first picker;
         obtaining the proximity constraints and the tote value constraints from the electronic database, wherein:
            the tote value constraints include a maximum weight capacity of each tote; and
            the item proximity constraints include a walking distance required of the first picker to pick all of the items assigned to the first picker for picking;
         performing an optimization determination based on the proximity constraints and the tote value constraints obtained by the item list optimization module from the electronic database for each additional order in the plurality of orders that determines whether items from the additional order are added to an existing batch or are assigned a new batch, and
         assigning, based on a result of the optimization determination, items in the plurality of orders to a plurality of batches; and
      transmits the plurality of assigned batches to a plurality of mobile devices associated with the plurality of pickers.

2. The system of claim 1, wherein the information stored in the electronic database includes a location of each of the items within the facility, and wherein the optimization module is further configured to determine proximity constraints based on the location information stored in the electronic database.

3. The system of claim 1, wherein the items are grocery items.

4. The system of claim 1, wherein assigning items in the plurality of orders to the plurality of batches includes ordering the items in each batch that reside on a same shelving unit from top to bottom and from left to right.

5. A method for optimization of order picking, the method comprising:
   receiving a plurality of orders, each order including a list of one or more items;
   providing a storage device including:
      an electronic database holding information regarding items in a facility, the electronic database configured to store electronic data representing item proximity constraints and electronic data representing tote value constraints, and
      an item list optimization module configured to determine order picking tasks and assign the order picking tasks to the pickers, the item list optimization module being configured to obtain the electronic data representing the item proximity constraints and the tote value constraints from the electronic database;
   by a server in communication with the storage device, executing the item list optimization module that, when executed by the server performs operations including:
   determining an order batch to be picked by each of a plurality of pickers using a plurality of totes, each tote of the plurality of totes having a physical capacity, wherein the determining includes:
      assigning items from a first order as a first batch to a first picker,
      obtaining the proximity constraints and the tote value constraints from the electronic database, wherein:
         the tote value constraints include a maximum weight capacity of each tote; and
         the item proximity constraints include a walking distance required of the first picker to pick all of the items assigned to the first picker for picking;

performing an optimization determination based on the proximity constraints and the tote value constraints obtained by the item list optimization module from the electronic database for each additional order in the plurality of orders that determines whether items from the additional order are added to an existing batch or are assigned to a new batch, and assigning, based on the result of the optimization determination, items in the plurality of orders to a plurality of batches; and transmitting the plurality of assigned batches to a plurality of mobile devices associated with the plurality of pickers.

6. The method of claim 5, further comprising accessing, in the electronic database, location information indicating a location of each item within the facility, wherein performing the optimization determination includes determining proximity constraints based on the location information.

7. The method of claim 5, wherein the items are grocery items.

8. The method of claim 5, wherein assigning items in the plurality of orders to the plurality of batches includes ordering the items in each batch that reside on a same shelving unit from top to bottom and from left to right.

9. A non-transitory computer readable medium for optimization of order picking, the medium having stored thereon instructions that when executed in a computing system, cause the computing system to perform operations comprising:

receiving a plurality of orders, each order including a list of one or more items;

providing a storage device including:
an electronic database holding information regarding items in a facility, the electronic database configured to store electronic data representing item proximity constraints and electronic data representing tote value constraints, and an item list optimization module configured to determine order picking tasks and assign the order picking tasks to the pickers, the item list optimization module being configured to obtain the electronic data representing the item proximity constraints and the tote value constraints from the electronic database;

by a server in communication with the storage device, executing the item list optimization module that, when executed by the server performs actions of:

determining an order batch to be picked by each of a plurality of pickers using a plurality of totes, each tote of the plurality of totes having a physical capacity, wherein the determining includes:

assigning items from a first order as a first batch to a first picker, obtaining the proximity constraints and the tote value constraints from the electronic database, wherein:
the tote value constraints include a maximum weight capacity of each tote; and
the item proximity constraints include a walking distance required of the first picker to pick all of the items assigned to the first picker for picking;

performing an optimization determination based on the proximity constraints and the tote value constraints obtained by the item list optimization module from the electronic database for each additional order in the plurality of orders that determines whether items from the additional order are added to an existing batch or are assigned to a new batch, and assigning, based on the result of the optimization determination, items in the plurality of orders to a plurality of batches; and transmitting the plurality of assigned batches to a plurality of mobile devices associated with the plurality of pickers.

10. The computer readable medium of claim 9, wherein the instructions further cause the computer to perform operations comprising accessing, in the electronic database, location information indicating a location of each item within the facility, wherein performing the optimization determination includes determining proximity constraints based on the location information.

11. The computer readable medium of claim 9, wherein the items are grocery items.

12. The computer readable medium of claim 9, wherein assigning items in the plurality of orders to the plurality of batches includes ordering the items in each batch that reside on a same shelving unit from top to bottom and from left to right.

* * * * *